(12) United States Patent
Shimojo et al.

(10) Patent No.: US 7,268,185 B2
(45) Date of Patent: Sep. 11, 2007

(54) THERMOPLASTIC RESIN COMPOSITION AND ITS INJECTION MOLDED ARTICLE

(75) Inventors: Moriyasu Shimojo, Valley Park (SG); Ryoji Matunaga, Ichihara (JP); Tsuyoshi Watanabe, Ichihara (JP)

(73) Assignee: Sumitomo Chemical Company, Limited, Osaka (JP)

( * ) Notice: Subject to any disclaimer, the term of this patent is extended or adjusted under 35 U.S.C. 154(b) by 227 days.

(21) Appl. No.: 10/943,228

(22) Filed: Sep. 17, 2004

(65) Prior Publication Data

US 2005/0101738 A1 May 12, 2005

(30) Foreign Application Priority Data

Sep. 24, 2003 (JP) .............................. 2003-331315
Sep. 24, 2003 (JP) .............................. 2003-331316

(51) Int. Cl.
*C08L 53/00* (2006.01)
*C08L 9/00* (2006.01)
*C08L 23/04* (2006.01)
*C08L 25/02* (2006.01)
*C08F 8/00* (2006.01)
*C08K 5/00* (2006.01)

(52) U.S. Cl. ................. 525/88; 525/191; 525/232; 525/240; 525/241; 524/500; 524/502; 524/505; 524/515; 524/525

(58) Field of Classification Search ................. 525/88, 525/191, 232, 240, 241; 524/500, 502, 505, 524/515, 525
See application file for complete search history.

(56) References Cited

U.S. PATENT DOCUMENTS

| | | | | |
|---|---|---|---|---|
| 6,306,972 B1 * | 10/2001 | Ohkawa et al. | ............. | 525/240 |
| 6,593,409 B2 * | 7/2003 | Ohkawa et al. | ............. | 524/423 |
| 6,759,465 B1 * | 7/2004 | Shimojo et al. | ............. | 524/451 |
| 2002/0004546 A1 | 1/2002 | Ohkawa et al. | | |

FOREIGN PATENT DOCUMENTS

| | | |
|---|---|---|
| JP | 7-286022 A | 10/1995 |
| JP | 7-286075 A | 10/1995 |
| JP | 2002-12718 A | 1/2002 |
| JP | 2002-30196 A | 1/2002 |

* cited by examiner

*Primary Examiner*—Nathan M. Nutter
(74) *Attorney, Agent, or Firm*—Foley and Lardner LLP

(57) ABSTRACT

Disclosed is a thermoplastic resin composition that contains specific amounts of polypropylene resin (A), elastomer (B), inorganic filler (C) and resin (D) which is composed of 60 to 80% by weight of a first segment which is a propylene homopolymer or a propylene-ethylene random copolymer and has an intrinsic viscosity, measured in tetralin at 135° C., of 5 dl/g or more and 20 to 40% by weight of a second segment which is a propylene homopolymer or a propylene-ethylene random copolymer and has an intrinsic viscosity, measured in tetralin at 135° C., of 0.8 to 1.2 dl/g.

4 Claims, No Drawings

THERMOPLASTIC RESIN COMPOSITION AND ITS INJECTION MOLDED ARTICLE

BACKGROUND OF THE INVENTION

1. Field of the Invention

The present invention relates to thermoplastic resin compositions and injection molded articles produced therefrom. In particular, the invention relates to a thermoplastic resin composition which is superior in moldability due to its superior fluidity and from which molded articles superior in rigidity, impact resistance and appearance can be produced by injection molding. It should be noted that in the present invention, the appearance of molded articles corresponds mainly to the condition of flow marks in the molded articles.

2. Description of the Related Art

Polypropylene-based resin has been used widely in materials required to have rigidity, impact strength and the like. Polypropylene-based resin has recently been used widely, particularly, as materials for automobiles, and especially, ethylene-propylene block copolymers are used increasingly. Although ethylene-propylene block copolymers have conventionally been produced by the solvent method, the ethylene-propylene block copolymers have recently been produced by the continuous gas phase method which comprises a simple production process and by which the ethylene-propylene block copolymer can be produced at low cost.

However, an ethylene-propylene block copolymer produced by the gas phase method has a low swelling ratio due to the lower intrinsic viscosity of its ethylene-propylene copolymer portion and, therefore, molded articles produced therefrom have poor appearance due to the occurrence of unfavorable flow marks. When the intrinsic viscosity of the ethylene-propylene copolymer portion of the ethylene-propylene block copolymer produced by the gas phase method is increased, hard spots are formed and molded articles produced therefrom have poor appearance.

For solving the problems regarding appearance described above, JP-A-07-286022, for example, discloses a propylene-based block copolymer produced by a batchwise solvent method, a n-decane(23° C.)-insoluble component of which has an intrinsic viscosity of 0.1 to 20 dl/g, a n-decane(23° C.)-soluble component of which has an intrinsic viscosity of 5 to 15 dl/g, and from which molded articles can be formed without the formation of hard spots. However, as disclosed in Comparative Example 3 in the above-cited document, when the n-decane(23° C.)-soluble component, which probably is an ethylene-propylene block copolymer portion, contained in an ethylene-propylene block copolymer has a high intrinsic viscosity, the ethylene-propylene block copolymer contains many rubber particles which will cause hard spots.

JP-A-07-286075 discloses a propylene polymer composition which comprises a propylene polymer produced by a continuous method and an ethylene-propylene block copolymer containing a n-decane(23° C.)-soluble component having an intrinsic viscosity of 5 to 12 dl/g and from which composition molded articles can be formed without the formation of hard spots. However, the amount of the ethylene-propylene block copolymer compounded is as large as 12% by weight or more.

SUMMARY OF THE INVENTION

The present invention is intended to provide a thermoplastic resin composition which is superior in moldability due to its superior fluidity and from which molded articles superior in rigidity, impact resistance and appearance can be produced by injection molding.

In one aspect of the present invention, provided is a thermoplastic resin composition comprising:
35 to 85% by weight of polypropylene resin (A),
1 to 35% by weight of elastomer (B),
2 to 30% by weight of inorganic filler (C), and
0.1 to 5% by weight of resin (D) defined below, wherein said amounts of the components (A), (B), (C) and (D) are each based on the combined weight of these four components:

resin (D): resin comprising 60 to 80% by weight of a first segment which is a propylene homopolymer or a propylene-ethylene random copolymer and has an intrinsic viscosity, measured in tetralin at 135° C., of 5 dl/g or more and 20 to 40% by weight of a second segment which is a propylene homopolymer or a propylene-ethylene random copolymer and has an intrinsic viscosity, measured in tetralin at 135° C., of 0.8 to 1.2 dl/g, wherein the amounts of the first and second segments are each based on the combined weight of the two segments.

In one preferred embodiment, the amount of polypropylene resin (A) is 56 to 85% by weight and the amount of elastomer (B) is 1 to 9% by weight.

In another preferred embodiment, the amount of elastomer (B) is 10 to 35% by weight.

Furthermore, in another aspect of the present invention, provided is an injection molded article comprising the aforementioned thermoplastic resin composition.

The thermoplastic resin composition of the present invention is of good fluidity and, therefore, injection molding of the composition can yield injection molded articles superior in rigidity, impact strength and appearance, in particular, the condition of flow marks.

DESCRIPTION OF THE PREFERRED EMBODIMENTS

The polypropylene-based resin (A) used in the present invention is a polypropylene resin with crystallinity, examples of which include a crystalline propylene homopolymer, a crystalline ethylene-propylene copolymer, a crystalline propylene-α-olefin copolymer and the like. These may be used alone or in combination. The polypropylene-based resin (A) is different from the resin (D) mentioned later.

The α-olefin to be used for the crystalline propylene-α-olefin copolymer includes α-olefins having at least four carbon atoms, preferably α-olefins having from 4 to 20 carbon atoms, and more preferably α-olefins having from 4 to 12 carbon atoms, examples of which include butene-1, pentene-1, hexene-1, heptene-1, octene-1 and decene-1. Examples of the crystalline propylene-α-olefin copolymer include a crystalline propylene-butene-1 copolymer and a crystalline propylene-hexene-1 copolymer.

From the viewpoint of mechanical properties, such as rigidity and impact resistance, of molded articles produced from a resin composition, the polypropylene resin having crystallinity is preferably a crystalline propylene homopolymer, a crystalline ethylene-propylene block copolymer or a mixture thereof. Particularly preferred is a crystalline ethylene-propylene block copolymer or a mixture of a crystalline ethylene-propylene block copolymer and a crystalline propylene homopolymer.

The crystalline ethylene-propylene block copolymer used as the polypropylene resin (A) is a crystalline ethylene-propylene block copolymer comprised of a propylene homopolymer portion, which is referred to as a "first segment," and an ethylene-propylene random copolymer portion, which is referred to as a "second segment."

From the viewpoints of moldability of a resin composition and mechanical properties, such as rigidity and impact resistance, of molded articles produced from the resin composition, the first segment preferably has a Q value, which is a ratio of the weight average molecular weight (Mw) to the number average molecular weight (Mn) determined by gel permeation chromatography (GPC), of from 3.0 to 5.0, more preferably from 3.5 to 4.5.

From the viewpoint of rigidity of molded articles produced from a resin composition, the first segment preferably has an isotactic pentad fraction, determined by $^{13}$C-NMR, of 0.98 or more, more preferably 0.99 or more. The upper limit of the isotactic pentad fraction is 1.

Further, from the viewpoint of moldability of a resin composition, the intrinsic viscosity $[\eta]_P$ of a 135° C. tetralin solution of the first segment is preferably from 0.7 to 1.2 dl/g, more preferably from 0.8 to 1.1 dl/g.

From the viewpoints of moldability of a resin composition and mechanical properties of molded articles produced from the resin composition, the intrinsic viscosity $[\eta]_{EP}$ of a 135° C. tetralin solution of the ethylene-propylene random copolymer portion, which is the second segment, is preferably not less than 1.0 dl/g but less than 8.0 dl/g, more preferably from 1.5 to 7.5 dl/g.

From the viewpoints of mechanical properties, such as impact resistance, of molded articles produced from a resin composition, the second segment preferably has an ethylene content $[(C2')_{EP}]$ of from 25 to 55% by weight, more preferably from 35 to 45% by weight.

From the viewpoint of moldability of a resin composition, the weight ratio of the second segment to the first segment is preferably from 8/92 to 35/65.

The crystalline propylene homopolymer used in the above-mentioned mixture of the crystalline ethylene-propylene block copolymer and the crystalline propylene homopolymer is a polymer having physical properties similar to those of the propylene homopolymer portion which is the first segment of the crystalline ethylene-propylene block copolymer. From the viewpoints of moldability of a resin composition and mechanical properties, such as rigidity and impact resistance, of molded articles produced from the resin composition, the crystalline propylene homopolymer preferably has a Q value, which is a ratio of the weight average molecular weight (Mw) to the number average molecular weight (Mn) determined by gel permeation chromatography (GPC), of from 3.0 to 5.0, more preferably from 3.5 to 4.5.

From the viewpoint of rigidity of molded articles produced from a resin composition, the crystalline propylene homopolymer used in the above-mentioned mixture preferably has an isotactic pentad fraction, determined by $^{13}$C-NMR, of 0.98 or more, more preferably 0.99 or more. The upper limit of the isotactic pentad fraction is 1.

Further, from the viewpoint of moldability of a resin composition, the intrinsic viscosity $[\eta]_P$ of a 135° C. tetralin solution of the crystalline propylene homopolymer used in the above-mentioned mixture is preferably from 0.7 to 1.2 dl/g, more preferably from 0.8 to 1.1 dl/g.

The method for producing the polypropylene resin (A) may be a method in which the resin is produced using a stereoregulating olefin polymerization catalyst and a known polymerization process. Examples of the catalyst include Ziegler-Natta catalysts, metallocene catalysts and catalysts comprising combinations thereof. Examples of the polymerization process include bulk polymerization, solution polymerization, slurry polymerization, gas phase polymerization and a polymerization process in which the foregoing polymerization processes are combined. Continuous gas phase polymerization is preferred.

In particular, a preferred method for producing the crystalline ethylene-propylene block copolymer is a method in which propylene is homopolymerized in the presence of a stereoregulating olefin polymerization catalyst in a first stage where a crystalline propylene homopolymer portion, which is the first segment, is obtained and subsequently ethylene and propylene are copolymerized in a second stage where an ethylene-propylene random copolymer portion, which is the second segment, is obtained.

The content of the polypropylene resin (A) in the thermoplastic resin composition of the present invention is from 35 to 85% by weight, preferably from 40 to 80% by weight and more preferably from 45 to 75% by weight. The content of the polypropylene resin (A) is appropriately adjusted by taking the amount of the elastomer (B) mentioned later into consideration. For example, when from 1 to 9% by weight of elastomer (B) is blended, the amount of polypropylene resin (A) is adjusted to from 56 to 85% by weight.

When the content of the polypropylene resin (A) is less than 35% by weight, the rigidity of molded articles produced from the resin composition may decrease. On the other hand, when over 85% by weight, the impact strength of molded articles produced from the resin composition may decrease.

The elastomer (B) used in the present invention is an elastomer containing a rubber component. Examples thereof include an elastomer comprising a vinyl aromatic compound-containing rubber, an elastomer comprising an ethylene-α-olefin random copolymer rubber, and an elastomer comprising a mixture of these rubbers.

Preferable examples of the vinyl aromatic compound-containing rubber used as elastomer (B) are block copolymers comprising a vinyl aromatic compound polymer block and a conjugated diene-based polymer block. From the viewpoint of weatherability of a resin composition and molded articles produced from the resin composition, preferred are those in which at least 80%, more preferably at least 85% of double bonds of the conjugated diene portion is hydrogenated, wherein said amounts are based on the number of the double bonds in the conjugated diene portion before the hydrogenation.

The vinyl aromatic compound-containing rubber preferably has a molecular weight distribution (Q value), determined by GPC (gel permeation chromatography), of 2.5 or less, more preferably 2.3 or less from the viewpoint of mechanical properties of molded article produced from the resin composition. The Q value of the vinyl aromatic compound-containing rubber is preferably 1.8 or more.

The average content of the vinyl aromatic compound in the vinyl aromatic compound-containing rubber is preferably from 10 to 20% by weight, more preferably from 12 to 19% by weight from the viewpoint of mechanical properties, such as rigidity and impact resistance, of molded article produced from the resin composition.

Further, the melt flow rate (MFR, JIS-K-6758, 230° C.) of the vinyl aromatic compound-containing rubber is preferably from 1 to 15 g/10 min, more preferably from 2 to 13 g/10 min from the viewpoint of moldability of the resin composition.

Examples of vinyl aromatic compound-containing rubbers to be used as elastomer (B) include block copolymers such as styrene-ethylene-butene-styrene-based rubber (SEBS), styrene-ethylene-propylene-styrene-based rubber (SEPS), styrene-butadiene-based rubber (SBR), styrene-butadiene-styrene-based rubber (SBS) and styrene-isoprene-styrene-based rubber (SIS), and block copolymers obtained by hydrogenation of those rubber components. A rubber obtained by reacting an olefin-based copolymer rubber such as an ethylene-propylene-non-conjugated diene-based rubber (EPDM) and a vinyl aromatic compound such as styrene may also be used suitably. Further, two or more of vinyl aromatic compound-containing rubbers may also be used together.

The method for the preparation of the vinyl aromatic compound-containing rubber to be used as elastomer (B) may be a method in which a vinyl aromatic compound is bonded, by polymerization, reaction or the like, to an olefin-based copolymer rubber, a conjugated diene rubber or the like.

The ethylene-α-olefin random copolymer rubber to be used as elastomer (B) is a random copolymer rubber made up of ethylene and α-olefin. The α-olefin is an α-olefin having 3 or more carbon atoms, such as propylene, butene-1, pentene-1, hexene-1, heptene-1, octene-1 and decene-1. Preferred are propylene, butene-1, hexene-1 and octene-1.

Examples of the ethylene-α-olefin random copolymer rubber include an ethylene-propylene random copolymer rubber, an ethylene-butene-1 random copolymer rubber, an ethylene-hexene-1 random copolymer rubber and an ethylene-octene-1 random copolymer rubber. Preferred are an ethylene-octene-1 random copolymer rubber, an ethylene-butene-1 random copolymer rubber and an ethylene-propylene random copolymer rubber. In addition, two or more ethylene-α-olefin random copolymer rubbers may be used in combination.

The ethylene-octene-1 random copolymer rubber to be used as elastomer (B) preferably has a Q value (i.e. a molecular weight distribution), determined by GPC, of 2.5 or less, more preferably 2.3 or less from the viewpoint of mechanical properties of molded articles produced from the resin composition. The Q value of the ethylene-octene-1 random copolymer rubber is preferably 1.8 or more.

The ethylene-octene-1 random copolymer rubber preferably has an octene-1 content of from 15 to 45% by weight, more preferably from 18 to 42% by weight from the viewpoint of impact resistance of molded articles produced from the resin composition.

The ethylene-octene-1 random copolymer rubber preferably has a melt flow rate (MFR, JIS-K-6758, 190° C.) of from 1 to 15 g/10 min, more preferably from 2 to 13 g/10 min from the viewpoints of moldability of the resin composition and impact resistance of molded articles produced from the resin composition.

The ethylene-butene-1 random copolymer rubber preferably is that having a Q value (i.e. a molecular weight distribution), determined by GPC, of 2.7 or less, more preferably 2.5 or less from the viewpoint of mechanical properties of molded articles produced from the resin composition. The Q value of the ethylene-butene-1 random copolymer rubber is preferably 1.8 or more.

The ethylene-butene-1 random copolymer rubber preferably has a butene-1 content of from 15 to 35% by weight, more preferably from 17 to 33% by weight from the viewpoint of impact resistance of molded articles produced from the resin composition.

The ethylene-butene-1 random copolymer rubber preferably has a melt flow rate (MFR, JIS-K-6758, 190° C.) of from 1 to 15 g/10 min, more preferably from 2 to 13 g/10 min from the viewpoints of moldability of the resin composition and impact resistance of molded articles produced from the resin composition.

The ethylene-propylene random copolymer rubber to be used as elastomer (B) is preferably that having a Q value (a molecular weight distribution), determined by GPC, of 2.7 or less, more preferably 2.5 or less from the viewpoint of mechanical properties of molded articles produced from the resin composition. The Q value of the ethylene-propylene random copolymer rubber is preferably 1.8 or more.

The ethylene-propylene random copolymer rubber preferably has a propylene content of from 20 to 30% by weight, more preferably from 22 to 28% by weight from the viewpoint of impact resistance of molded articles produced from the resin composition.

The ethylene-propylene random copolymer rubber preferably has a melt flow rate (MFR, JIS-K-6758, 190° C.) of from 1 to 15 g/10 min, more preferably from 2 to 13 g/10 min from the viewpoints of moldability of the resin composition and impact resistance of molded articles produced from the resin composition.

Examples of the method for producing the ethylene-α-olefin random copolymer rubber to be used as elastomer (B) include methods comprising copolymerizing ethylene and various kinds of α-olefin by known polymerization methods using known catalysts. Examples of the catalysts include catalyst systems comprising a vanadium compound and an organoaluminum compound, Ziegler-Natta catalyst systems and metallocene catalyst systems. Examples of the polymerization methods include solution polymerization, slurry polymerization, high pressure ion polymerization and gas phase polymerization.

The content of the elastomer (B) in the thermoplastic resin composition of the present invention is from 1 to 35% by weight. From the viewpoint of the balance between the rigidity and the impact resistance of molded articles produced from the resin composition, it is preferably from 1 to 9% by weight, more from 3 to 8% by weight. From the viewpoints of the impact strength, rigidity and heat resistance of molded articles produced from the resin composition, it is preferably from 10 to 35% by weight, more preferably from 12 to 30% by weight.

The inorganic filler (c) used in the present invention may be any one which can improve the rigidity of molded articles produced from the resin composition. Examples thereof include calcium carbonate, barium sulfate, mica, crystalline calcium silicate, talc and magnesium sulfate fiber. Preferred are talc, magnesium sulfate fiber and mixtures thereof.

From the viewpoints of the rigidity and heat resistance of molded articles produced from the resin composition, the talc to be used as inorganic filler (C) is preferably one obtained by pulverizing hydrous magnesium silicate. The crystal structure of the molecule thereof is a pyrophyllite-type three-layer structure. Talc comprises a lamination of this structure and preferably is a tabular powder resulting from fine pulverization of its crystals almost into unit layers.

From the viewpoints of mechanical properties, such as rigidity and impact resistance, of molded article produced from the resin composition, the talc to be used as inorganic filler (C) preferably has an average particle size of 3 μm or less. The average particle size of talc is a 50% equivalent particle size $D_{50}$ determined based on an integrated distribution curve produced by use of a minus sieve method using a centrifugal sedimentation type particle size distribution analyzer wherein talc is suspended in a dispersion medium such as water and alcohol.

The talc to be used as inorganic filler (C) may be employed as received without being subjected to any treatment. Alternatively, it may be employed after being surface-treated with a variety of silane couplers, titanium couplers, or surfactants such as higher fatty acids, higher fatty acid esters, higher fatty acid amides and higher fatty acid salts in order to improve the interfacial adhesiveness to the polypropylene resin (A) and to improve the dispersibility.

From the viewpoints of mechanical properties, such as rigidity and impact resistance, of molded article produced from the resin composition, the magnesium sulfate fiber to be used as inorganic filler (C) preferably has an average length of from 5 to 50 µm, more preferably from 10 to 30 µm.

From the viewpoints of mechanical properties, such as rigidity and impact resistance, of molded article produced from the resin composition, the magnesium sulfate fiber preferably has an average diameter of from 0.3 to 2.0 µm, more preferably from 0.5 to 1.0 µm.

The content of the inorganic filler (C) in the thermoplastic resin composition of the present invention is from 2 to 30% by weight, preferably from 5 to 30% by weight, more preferably from 10 to 30% by weight. When the content of the inorganic filler is less than 2% by weight, the rigidity of molded article produced from the resin composition may decrease. On the other hand, when over 30% by weight, the impact strength of the molded articles may be insufficient and the appearance of the molded articles may also deteriorate.

Resin (D) in the present invention is a resin comprising 60 to 80% by weight of a first segment which is a propylene homopolymer or a propylene-ethylene random copolymer and has an intrinsic viscosity, measured in tetralin at 135° C., of 5 dl/g or more and 20 to 40% by weight of a second segment which is a propylene homopolymer or a propylene-ethylene random copolymer and has an intrinsic viscosity, measured in tetralin at 135° C., of 0.8 to 1.2 dl/g, wherein the amounts of the first and second segments are each based on the combined weight of the two segments.

The polypropylene homopolymer or ethylene-propylene random copolymer which is the first segment contained in resin (D) has an intrinsic viscosity, measured in tetralin at 135° C., of 5 dl/g or more, preferably from 5 to 15 dl/g, and more preferably from 5 to 12 dl/g. If the first segment of resin (D) is replaced with a polymer having an intrinsic viscosity less than 5 dl/g, molded articles produced from the resin composition may have noticeable flow marks and, therefore, may have poor appearance. On the other hand, if the first segment of resin (D) is replaced with a polymer having a too-high intrinsic viscosity, hard spots are formed easily in the resin composition and, as a result, the appearance of molded articles produced from the resin composition may be poor.

The polypropylene homopolymer or ethylene-propylene random copolymer which is the second segment contained in resin (D) has an intrinsic viscosity, measured in tetralin at 135° C., of from 0.8 to 1.2 dl/g, preferably from 0.8 to 1.1 dl/g, and more preferably from 0.8 to 1.0 dl/g. If the second segment of resin (D) is replaced with a polymer having an intrinsic viscosity less than 0.8 dl/g, molded articles produced from the resin composition may have insufficient mechanical properties. On the other hand, if the second segment of resin (D) is replaced with a polymer having an intrinsic viscosity exceeding 1.2 dl/g, the resin composition may have an insufficient fluidity.

If the content of the first segment in resin (D) is less than 60% by weight, molded articles produced from the resin composition may have poor appearance. If the content is larger than 80% by weight, the resin composition may have an insufficient fluidity.

If the content of the second segment in resin (D) is less than 20% by weight, the resin composition may have an insufficient fluidity. If the content is larger than 40% by weight, molded articles produced from the resin composition may have poor appearance.

The content of resin (D) in the thermoplastic resin composition of the present invention is from 0.1 to 5% by weight, preferably from 0.5 to 4.5% by weight, and more preferably from 1.0 to 4.5% by weight. If the content of resin (D) is less than 0.1% by weight, molded articles produced from the resin composition may have poor appearance. If the content is larger than 5% by weight, the resin composition may have an insufficient fluidity.

The methods for preparing the first and second segments of resin (D) may be methods using a polymerization technique employing a stereoregulating olefin polymerization catalyst. Examples of the catalyst include Ziegler-Natta catalysts, metallocene catalysts and catalysts comprising combinations thereof. Examples of the polymerization technique include bulk polymerization, solution polymerization, slurry polymerization, gas phase polymerization and polymerization in which the foregoing polymerization techniques are optionally combined. Continuous gas phase polymerization is preferred.

The method for preparing resin (D) may be a method comprising polymerizing propylene or propylene and ethylene to form the first segment and the second segment separately and then mixing or melt-kneading the first and second segments together. Another available one is a method comprising a step of producing the first segment by polymerizing propylene or a mixture of propylene and ethylene and a step of producing the second segment by polymerizing propylene or a mixture of propylene and ethylene wherein the first segment and the second segment may be produced continuously in an arbitrary order. Preferred is the method comprising a step of producing the first segment by polymerizing propylene or a mixture of propylene and ethylene and a step of producing the second segment by polymerizing propylene or a mixture of propylene and ethylene wherein the first segment and the second segment are produced continuously in an arbitrary order.

The thermoplastic resin composition of the present invention can be produced using a kneading machine such as a single-screw extruder, a twin-screw extruder, a Banbury mixer and hot rolls. Addition and mixing of the components into the kneading machine may be conducted simultaneously or divisionally. The method for the addition and mixing may be, but is not restricted to, the following methods.

(Method 1) A method in which polypropylene resin (A) and inorganic filler (C) are kneaded, elastomer (B) is subsequently added to the mixture, and then resin (D) is added and kneaded.

(Method 2) A method in which inorganic filler (C) is kneaded in a high concentration with polypropylene resin (A) to obtain a masterbatch, the masterbatch is diluted with polypropylene resin (A), elastomer (B) or the like, and then resin (D) is added and kneaded.

(Method 3) A method in which polypropylene resin (A) and elastomer (B) are kneaded first, inorganic filler (C) is added to the mixture, and then resin (D) is added and kneaded.

(Method 4) A method in which elastomer (B) is kneaded in a high concentration with polypropylene resin (A) to obtain a masterbatch, polypropylene resin (A) and inorganic filler (C) are added to the masterbatch, and then resin (D) is added and kneaded.

(Method 5) A method in which polypropylene resin (A) and inorganic filler (C) are kneaded together and, separately, polypropylene resin (A) and elastomer (B) are kneaded together, thereafter the resulting mixtures are combined, and then a resin (D) is added and kneaded.

The kneading temperature is usually from 170 to 250° C., more preferably from 190 to 230° C. The kneading time is usually from 1 to 20 minutes, more preferably from 3 to 15 minutes.

The thermoplastic resin composition of the present invention may contain, in addition to the aforementioned components (A), (B), (C) and (D), additives such as antioxidants, ultraviolet absorbers, lubricants, pigments, antistatic agents, copper inhibitors, flame retardants, neutralizing agents, foaming agents, plasticizers, nucleating agents, foam inhibitors and crosslinking agents.

The thermoplastic resin composition of the present invention can be molded into injection-molded articles by injection molding. Particularly, the injection-molded articles are suitably used as automotive parts such as door trims, pillars, instrument panels, consoles and bumpers.

EXAMPLES

The present invention is described by way of Examples and Comparative Examples. However, the invention is not restricted to Examples.

The components used in Examples and Comparative Examples are shown below.

(1) Polypropylene Resin (A)

Ethylene-Propylene Block Copolymer (A-1) (Resin A-1)

Resin A-1 is a crystalline ethylene-propylene block copolymer composed of a propylene homopolymer portion and an ethylene-propylene random copolymer portion.

[Preparation]

(1) Preliminary Polymerization

In a SUS autoclave equipped with a stirrer, 25 mmol/L of triethylaluminum (hereafter abbreviated as TEA), cyclohexylethyldimethoxysilane (hereafter abbreviated as CHEDMS) in a ratio CHEDMS/TEA of 0.1 (mol/mol), and a solid catalyst component I disclosed in JP-A-10-212319 in such an amount that the Ti content in the catalyst component in terms of [TEA]/[Ti] was 5 (mol/mol) were added in this order. By supplying propylene continuously so that the polymer weight ratio (hereafter abbreviated as PP/cat) per gram of the solid catalyst component was adjusted to 2.5 (g/g) while maintaining the temperature between 5° C. and 15° C., a preliminary polymer slurry was obtained. The preliminary polymer slurry was transferred to another SUS autoclave equipped with a stirrer, diluted by addition of fully refined liquid butane, and preserved at a temperature of 10° C. or lower.

(2) Main Polymerization

Three polymerization reactors were connected in series. A propylene homopolymer portion (i.e. the first segment) was produced by polymerization conducted continuously by gas phase polymerization in the first and second reactors and then the product formed in the second reactor was transferred to the next reactor (i.e. the third reactor). Then, in the third reactor, polymerization for producing a propylene-ethylene random copolymer portion (i.e. the second segment) was conducted continuously by gas phase polymerization.

In the first and second reactors, at a temperature in reactor of 80° C. and a pressure in reactor of 1.8 MPa, the preliminary polymer slurry was subjected to continuous gas phase polymerization under conditions where the amounts of propylene and hydrogen in the gas phase were maintained at 90 vol % and 7.4 vol %, respectively while supplying TEA and CHEDMS as solid catalyst components. The catalyst components were supplied so that their concentrations in the resulting polymer were [TEA]=about 200 ppm, [CHEDMS]/[TEM]=0.1 (mol/mol) and PP/cat=28000 (g/g). The average residence time combined in the first and second reactors was 5.3 hr. The resulting propylene homopolymer portion had an intrinsic viscosity $[\eta]_P$ of 1.0 dl/g. In the third reactor, gas phase polymerization was conducted continuously at a temperature in reactor of 65° C. and a pressure in reactor of 1.4 MPa under conditions where the amounts of propylene, ethylene and hydrogen in the gas phase were maintained at 68 vol %, 26 vol % and 4 vol %, respectively. The catalyst components were supplied so that their concentrations in the resulting polymer were [TEA]=about 270 ppm, [CHEDMS]=48 ppm and PP/cat=6000 (g/g). The average residence time was 1.3 hr. The resulting ethylene-propylene random copolymer portion had an intrinsic viscosity $[\eta]_{EP}$ of 2.2 dl/g and an ethylene content of 45% by weight. The content of the ethylene-propylene random copolymer portion in the resulting ethylene-propylene block copolymer was 18% by weight.

Ethylene-Propylene Block Copolymer (A-2) (Resin A-2)

A crystalline ethylene-propylene block copolymer having an MFR of 55 g/10min obtained by peroxide decomposition of a crystalline ethylene-propylene block copolymer, COSMOPLENE AZ864 (manufactured by The Polyolefin Company; MFR=38 g/10 min), comprising a propylene homopolymer portion and an ethylene-propylene random copolymer portion.

Ethylene-Propylene Block Copolymer (A-3) (Resin A-3)

A crystalline ethylene-propylene block copolymer having an MFR of 50 g/10 min obtained by peroxide decomposition of the aforementioned Resin A-1.

(2) Elastomer (B)

Ethylene-Octene-1 Copolymer Rubber (Elastomer B-1)

Engage EG8200 manufactured by DuPont Dow Elastomers L.L.C.

Ethylene-Butene-1 Copolymer Rubber (Elastomer B-2)

Esprene SPO N0416 manufactured by Sumitomo Chemical Co., Ltd.

(3) Inorganic Filler (C)

Talc available under the trade name of MW HS-T from Hayashi Kasei Co.

(4) Resin (D)

[Preparation]

(4-1) Solid Catalyst Component (I)

Following replacement of the atmosphere in a 200-L SUS reactor equipped with a stirrer with nitrogen, 80 L of hexane, 6.55 mol of tetrabutoxytitanium, 2.8 mol of diisobutyl phthalate and 98.9 mol of tetraethoxysilane were fed to form a homogeneous solution. Then, 51 L of a butylmagnesium chloride solution in diisobutyl ether at a concentration of 2.1 mol/L was dropped slowly over 5 hours while holding the temperature in the reactor at 5° C. After the dropping, the mixture was stirred at 5° C. for 1 hour and at room temperature for additional 1 hour. Subsequently, solid-liquid separation was performed at room temperature and washing with 70 L toluene was repeated three times. Then, the amount of toluene was adjusted so that the slurry concentration became 0.2 kg/L and the resulting slurry was stirred at 105° C. for 1 hour. Then, the mixture was cooled to 95° C. and 47.6 mol of diisobutyl phthalate was added, followed by a reaction at 95° C. for 30 minutes. After the reaction, solid-liquid separation was performed and washing with toluene was repeated twice. Then, the amount of toluene was adjusted so that the slurry concentration became 0.4 kg/L, 3.1 mol of diisobutyl phthalate, 8.9 mol of di-n-butyl ether and 274 mol of titanium tetrachloride were added, followed by a reaction at 105° C. for 3 hours. After the completion of the reaction, solid-liquid separation was performed and washing with 90-L toluene at that temperature was carried out twice. The amount of toluene was adjusted so that the slurry concentration became 0.4 kg/L, 8.9 mol of di-n-butyl ether and 137 mol of titanium tetrachloride were added, followed by a reaction at 105° C. for 1 hour. After the completion of the reaction, solid-liquid separation was performed at that temperature and washing with 90-L toluene at the same temperature was carried out three times. After additional three-time washing with 70-L hexane, the residue was dried under reduced pressure, yielding 11.4 kg of solid catalyst component, which contained 1.83% by weight of titanium atom, 8.4% by weight of phthalate, 0.30% by weight of ethoxy group and 0.20% by weight of butoxy group. This solid catalyst component is hereinafter called solid catalyst component (I).

(4-2) Preliminary Polymerization

In a 3-L SUS autoclave equipped with a stirrer, 25 mmol/L of triethylaluminum (hereafter abbreviated TEA), tert-butyl-n-propyldimethoxysilane (hereafter abbreviated tBnPDMS) as a proton donor component, wherein tBnPDMS/TEA=0.1 (mol/mol), and 15 g/L of solid catalyst component (I) were added to hexane which had been fully dewatered and degassed. Subsequently, a preliminary polymerization was carried out by feeding propylene continuously until the amount of the propylene became 1 g per gram of the solid catalyst while keeping the temperature at 15° C. or lower. The resulting preliminary polymer slurry was transferred to a 120-L SUS dilution vessel with a stirrer, diluted by addition of a fully refined liquid butane, and preserved at a temperature of 10° C. or lower.

(4-3) Main Polymerization

In a 300-L SUS polymerization reactor equipped with a stirrer, liquefied propylene was fed at a rate of 35 kg/h so as to keep a polymerization temperature of 60° C. and a slurry amount of 95 L. Furthermore, ethylene was fed so as to keep an ethylene concentration in a gas phase portion of 2.8 vol %, and a continuous copolymerization of propylene-ethylene was conducted in the substantial absence of hydrogen while feeding TEA at 51 mmol/h, tBunPrDMS at 5 mmol/h and the polymer slurry preliminarily prepared in (4-2) as a solid catalyst component at 1.0 g/h, yielding a polymer at 6.1 kg/h. The resulting polymer was transferred continuously to a second reactor without being deactivated. In the second reactor, a SUS fluidized bed gas phase reactor having a content volume of 1 m³ equipped with a stirrer, propylene and ethylene were continuously fed so as to keep a polymerization temperature of 70° C., a polymerization pressure of 1.8 MPa and an ethylene concentration in the gas phase portion of 1.9 vol %, and a continuous gas phase polymerization was continued using the solid catalyst component-containing polymer transferred from the first reactor in the substantial absence of hydrogen, yielding a polymer at 15.7 kg/h. The polymer component produced in the first and second reactors corresponds to a first segment, and has an intrinsic viscosity [η] of 8.7 dl/g, an ethylene content of 3.5% by weight, and a melting temperature peak of 144.8° C. Subsequently, the resulting polymer was transferred continuously to a third reactor without being deactivated. In the third reactor, SUS gas phase fluidized bed reactor having a content volume of 1 m³ equipped with a stirrer, propylene and hydrogen were continuously fed as to keep a polymerization temperature of 85° C., a polymerization pressure of 1.4 MPa and a hydrogen concentration in a gas phase portion of 11.7 vol %, and continuous gas phase polymerization was continued using the polymer containing a solid catalyst component fed from the second reactor, yielding a polymer at 25.6 kg/h. The polymer component produced in the third reactor corresponds to a second segment. The polymer obtained through the first reactor to the third reactor is a resin (D) composed of the first and second segments, the intrinsic viscosity [η] of which was 5.7 dl/g. From the above-mentioned results, it was determined that the ratio of the total polymerization amount of the first and second reactors to the polymerization amount of the third reactor was 61:39, and the polymer produced in the third reactor had an intrinsic viscosity [η] of 0.9 dl/g.

(5) BCPP-1

BCPP-1, which is an ethylene-propylene block copolymer, contained a propylene homopolymer portion having a molecular weight distribution (Q value) of 4.0, an intrinsic viscosity $[\eta]_P$ of 0.91 dl/g and an isotactic pentad fraction of 0.99. The ethylene-propylene block copolymer also contained an ethylene-propylene random copolymer portion having an intrinsic viscosity $[\eta]_{EP}$ of 11.5 dl/g. The content of the ethylene-propylene random copolymer portion in the ethylene-propylene block copolymer was 25.1% by weight and the ethylene content in the ethylene-propylene random copolymer portion was 23.1% by weight.

The methods for measuring physical properties of the resin components and the compositions used in the Examples and the Comparative Examples are shown below.

(1) Melt Flow Rate (MFR, Unit: g/10 min)

The melt flow rate was measured according to the method defined in JIS-K-6758. Unless otherwise stated, it was measured at a measurement temperature of 230° C. and a load of 2.16 kgf.

(2) Flexural Modulus (FM, Unit: MPa)

The flexural modulus was measured according to the method defined in JIS-K-7203. It was measured under a load speed of 2.0 mm/min at a temperature of 23° C. and a span length of 100 mm using an injection-molded specimen having a thickness of 6.4 mm.

(3) Izod Impact Strength (Izod, Unit: kJ/m²)

The Izod impact strength was measured according to the method defined in JIS-K-7110. It was measured at a temperatures of 23° C. and −30° C. using a notched injection-molded specimen having a thickness of 6.4 mm.

(4) Heat Distortion Temperature (HDT, Unit: ° C.)

The heat distortion temperature was measured according to the method defined in JIS-K-7207. It was measured at a fiber stress of 1.82 MPa and a span length of 100 mm using an injection-molded specimen having a thickness of 6.4 mm.

(5) Rockwell Hardness (HR)

The rockwell hardness was measured according to the method defined in JIS-K-7202. It was measured using an injection-molded specimen having a thickness of 3.0 mm. The measurements are shown in R scale.

(6) Brittle Temperature (BP, Unit: °C.)

The brittle temperature was measured according to the method defined in JIS-K-7216. A given specimen having a size of 6.3 mm×38 mm×2 mm was punched out from an injection-molded flat plate having a size of 25 mm×150 mm×2 mm, and the measurement was conducted using this specimen.

(7) Intrinsic Viscosity (Unit: dl/g)

Reduced viscosities were measured at three points of concentrations of 0.1, 0.2 and 0.5 g/dl using a Ubbelohde viscometer. The intrinsic viscosity was calculated by the calculation method described on page 491 in "Kobunshi Yoeki (Polymer Solution), Kobunshi Jikkengaku (Polymer Experiment Study) 11" (published by Kyoritsu Shuppan K. K., 1982), namely, by an extrapolation method in which reduced viscosities are plotted against concentrations and the concentration is extrapolated in zero.

Regarding a crystalline polypropylene, the intrinsic viscosity was measured at a temperature of 135° C. using tetralin as a solvent.

(7-1) Intrinsic Viscosity of Crystalline Ethylene-Propylene Block Copolymer (7-1a) Intrinsic Viscosity of Propylene Homopolymer Portion (i.e. First Segment): $[\eta]_P$ The intrinsic viscosity: $[\eta]_P$ of a propylene homopolymer portion, which is a first segment, of a crystalline ethylene-propylene block copolymer was measured as follows. A propylene homopolymer was sampled from a polymerization reactor during its production after polymerization of the propylene homopolymer portion as the first step. The propylene homopolymer sampled was measured for intrinsic viscosity $[\eta]_P$.

(7-1b) Intrinsic Viscosity of Ethylene-propylene Random Copolymer Portion (Second Segment): $[\eta]_{EP}$ The intrinsic viscosity $[\eta]_{EP}$ of an ethylene-propylene random copolymer portion which is a second segment of a crystalline ethylene-propylene block copolymer was determined by measuring the intrinsic viscosity, $[\eta]_P$, of a propylene homopolymer portion and the intrinsic viscosity, $[\eta]_T$, of the total ethylene-propylene block copolymer, respectively, and effecting calculation according to the following equation using weight ratio, X, of the ethylene-propylene random copolymer portion to the total crystalline ethylene-propylene block copolymer.

$$[\eta]_{EP}=[\eta]_T/X-(1/X-1)[\eta]_P$$

$[\eta]_P$: Intrinsic Viscosity of Propylene Homopolymer Portion (dl/g)

$[\eta]_T$: Intrinsic Viscosity of Total Block Copolymer (dl/g)

(7-1c) Weight Ratio of Ethylene-Propylene Random Copolymer Portion to Total Crystalline Ethylene-Propylene Block Copolymer: X The weight ratio, X, of an ethylene-propylene random copolymer portion to the total crystalline ethylene-propylene block copolymer was obtained by measuring the crystal fusion heats of a propylene homopolymer portion (first segment) and the total crystalline ethylene-propylene block copolymer, respectively, and effecting calculation using the following equation. The crystal fusion heat was measured by differential scanning calorimetry (DSC.).

$$X=1-(\Delta H_f)_T/(\Delta H_f)_P$$

$(\Delta H_f)_T$: Fusion heat of total block copolymer (cal/g)

$(\Delta H_f)_P$: Fusion heat of propylene homopolymer portion (cal/g)

(8) Ethylene Content of Ethylene-propylene Random Copolymer Portion in Crystalline Ethylene-propylene Block Copolymer: $(C_2')_{EP}$ The ethylene content, $(C_2')_{EP}$, of an ethylene-propylene random copolymer portion in a crystalline ethylene-propylene block copolymer was determined by measuring the ethylene content $(C_2')_T$ of the total crystalline ethylene-propylene block copolymer by infrared absorption spectrometry, and effecting calculation using the following equation.

$$(C_2')_{EP}=(C_2')_T/X$$

$(C_2')_T$: Ethylene content (wt %) of total block copolymer $(C_2')_{EP}$: Ethylene content (wt %) of ethylene-propylene random copolymer portion X: Weight ratio of the ethylene-propylene random copolymer portion to the total crystalline ethylene-propylene block copolymer (9) Isotactic Pentad Fraction The isotactic pentad fraction is a fraction of propylene monomer units existing at the center of an isotactic chain in the form of a pentad unit, in other words, the center of a chain in which five propylene monomer units are meso-bonded successively, in the polypropylene molecular chain as measured by the method disclosed in A. Zambelli et al., Macromolecules, 6, 925 (1973), namely, by use of $^{13}$C-NMR. However, the assignment of NMR absorption peaks was conducted based on Macromolecules, 8, 687 (1975).

Specifically, the isotactic pentad fraction was measured as an area fraction of mmmm peaks in all absorption peaks in the methyl carbon region of a $^{13}$C-NMR spectrum. According to this method, the isotactic pentad fraction of an NPL standard substance, CRM No. M19-14 Polypropylene PP/MWD/2 available from NATIONAL PHYSICAL LABORATORY, G. B. was measured to be 0.944.

(10) Molecular Weight Distribution (Q Value)

A gel permeation chromatograph (GPC) was measured under the following conditions.

GPC: Model 150C, manufactured by Waters

Column: Shodex 80 MA, two columns, manufactured by Showa Denko K. K.

Amount of sample: 300 μl (polymer concentration: 0.2 wt %)

Flow rate: 1 ml/min

Temperature: 135° C.

Solvent: o-Dichlorobenzene

A calibration curve of the elution volume vs. the molecular weight was produced using a standard polystyrene manufactured by Tosoh Corporation. The polystyrene-reduced weight average molecular weight and the number average molecular weight were calculated using the calibration curve, and a Q value, which is a scale of molecular weight distribution, was calculated according to the formula: weight average molecular weight (Mw)/number average molecular weight (Mn).

(11) Appearance

The appearance of a specimen prepared by injection molding was observed visually and was judged to be good or poor. When streaks are not found or are found locally in a specimen, the appearance of the specimen is judged to be good. When streaks are found throughout or almost throughout a specimen, the appearance of the specimen is judged to be poor.

(Production of Injection Molded Article)

Specimens, which are injection-molded articles, for evaluation of physical properties in the above-mentioned (2), (3), (4), (5), (6) and (11) were manufactured by the following method.

A composition was dried in a hot air drier at 120° C. for 2 hours, and then injection-molded with an injection molding machine, model IS150E-V, manufactured by Toshiba Machine Co., Ltd. at a molding temperature of 220° C., a mold cooling temperature of 50° C., an injection time of 15 sec and a cooling time of 30 sec, resulting in specimens.

(Production of Thermoplastic Resin Composition)

A thermoplastic resin composition was produced by the following method.

Predetermined amounts of components were weighed, preliminarily mixed homogenously in a tumbler mixer, then, kneaded and extruded with a twin-screw kneading extruder (TEX44SS 30BW-2V type, manufactured by The Japan Steel Works, Ltd.) at an extrusion rate of from 30 to 50 kg/hr and a screw revolution of 350 rpm under vent suction, resulting in a composition. The screw was constituted so that a triple thread type rotor and a kneading disc are arranged at two positions in a kneading zone, namely, a position next to a first feed inlet and a position next to a second feed inlet.

The contents (% by weight) of the components in the thermoplastic resin compositions of Examples 1 to 4 are shown in Table 1.

The physical properties of the thermoplastic resin compositions of Examples 1 to 4 and the physical properties and appearance of the injection-molded articles produced using the compositions are shown in Table 2.

TABLE 1

|  |  | Examples | | | |
| --- | --- | --- | --- | --- | --- |
|  |  | 1 | 2 | 3 | 4 |
| Composition (wt %) | Resin A-1 | 70 | 73.5 | 67.5 | 65.5 |
|  | Elastomer B-1 | 8 | 4 | 8 | 8 |
|  | Inorganic filler (C) | 21 | 21.5 | 21.5 | 21.5 |
|  | Resin (D) | 1 | 1 | 3 | 5 |

TABLE 2

|  | Examples | | | |
| --- | --- | --- | --- | --- |
|  | 1 | 2 | 3 | 4 |
| MFR (g/10 min) | 23.5 | 33.4 | 25.6 | 21.6 |
| FM (MPa) | 2059 | 2315 | 2108 | 2081 |
| Izod 23° C. (kJ/m²) | 35.2 | 16.8 | 39.3 | 32.6 |
| −30° C. (kJ/m²) | 3.7 | 2.5 | 3.2 | 3.1 |
| HDT (° C.) | 70.4 | 73.2 | 70.5 | 69.7 |
| HR (R scale) | 65.3 | 77.8 | 69.4 | 69.9 |
| BP (° C.) | −3.7 | 7.2 | 0.4 | 3.3 |
| Appearance | good | good | good | good |

Examples 1 to 4 are directed to thermoplastic resin compositions satisfying the requirements of the present invention. The resulting injection-molded articles were excellent in balance between rigidity (flexural modulus, heat distortion temperature and Rockwell hardness) and impact strength (Izod impact strength and brittle temperature) and were of good appearance.

The contents (% by weight) of the components in the thermoplastic resin compositions of Examples 5 to 10 are shown in Table 3. The contents (% by weight) of the components in the thermoplastic resin compositions of Comparative Examples 1 to 3 are shown in Table 4.

The physical properties of the thermoplastic resin compositions of Examples 5 to 10 and the physical properties and appearance of the injection-molded articles produced using the compositions are shown in Table 5. The physical properties of the thermoplastic resin compositions of Comparative Examples 1 to 3 and the physical properties and appearance of the injection-molded articles produced using the compositions are shown in Table 6.

TABLE 3

|  |  | Examples | | | | | |
| --- | --- | --- | --- | --- | --- | --- | --- |
|  |  | 5 | 6 | 7 | 8 | 9 | 10 |
| Composition (wt %) | Ethylene-propylene block copolymer (A) | | | | | | |
|  | Resin A-2 | 63.5 | 71 | 0 | 0 | 66.5 | 62.5 |
|  | Resin A-3 | 0 | 0 | 61 | 62 | 0 | 0 |
|  | Elastomer (B) | | | | | | |
|  | Elastomer B-1 | 15.5 | 8 | 0 | 0 | 15.5 | 15.5 |
|  | Elastomer B-2 | 0 | 0 | 20 | 20 | 0 | 0 |
|  | Inorganic filler (C) | 17 | 17 | 14 | 14 | 17 | 17 |
|  | Resin (D) | 4 | 4 | 5 | 4 | 1 | 5 |

TABLE 4

|  |  | Comparative Examples | | |
| --- | --- | --- | --- | --- |
|  |  | 1 | 2 | 3 |
| Composition (wt %) | Resin A-2 | 63.5 | 55.5 | 52.5 |
|  | Elastomer B-1 | 15.5 | 15.5 | 15.5 |
|  | Inorganic filler (C) | 17 | 17 | 17 |
|  | Resin (D) | 0 | 0 | 0 |
|  | BCPP-1 | 4 | 12 | 15 |

TABLE 5

|  | Examples | | | | | |
| --- | --- | --- | --- | --- | --- | --- |
|  | 5 | 6 | 7 | 8 | 9 | 10 |
| MFR (g/10 min) | 32.2 | 37.8 | 22.9 | 24.0 | 45.2 | 30.5 |
| FM (MPa) | 1495 | 1691 | 1319 | 1322 | 1427 | 1484 |
| Izod 23° C. (kJ/m²) | 53.2 | 30.8 | 53.5 | 54.3 | 51.7 | 51.0 |
| −30° C. (kJ/m²) | 4.2 | 3.3 | 4.6 | 4.9 | 4.6 | 4.4 |
| HDT (° C.) | 58.6 | 64.9 | 58.4 | 57.0 | 57.1 | 59.4 |
| HR (R scale) | 50.5 | 65.6 | 40.9 | 40.4 | 49.2 | 50.4 |
| BP (° C.) | −19.7 | −2.6 | −25.2 | −25.0 | −25.2 | −20.4 |
| Appearance | good | good | good | good | good | good |

TABLE 6

|  | Comparative Examples | | |
|---|---|---|---|
|  | 1 | 2 | 3 |
| MFR (g/10 min) | 41.7 | 28.9 | 25.8 |
| FM (MPa) | 1408 | 1394 | 1365 |
| Izod 23° C. (kJ/m$^2$) | 56.4 | 63.4 | 57.3 |
| −30° C. (kJ/m$^2$) | 4.5 | 4.4 | 4.6 |
| HDT (° C.) | 56.8 | 59.0 | 58.6 |
| HR (R scale) | 48.7 | 49.1 | 49.1 |
| BP (° C.) | −27.2 | −26.0 | −26.1 |
| Appearance | poor | good | good |

Examples 5 to 10 are directed to thermoplastic resin compositions satisfying the requirement of the present invention. The resulting injection-molded articles were excellent in balance between rigidity (flexural modulus, heat distortion temperature and Rockwell hardness) and impact strength (Izod impact strength and brittle temperature) and were of good appearance.

In contrast, in Comparative Example 1, BCPP-1, which does not satisfy the requirement of resin (D), was employed in place of resin (D) and the resulting injection-molded article is of defective appearance.

In Comparative Examples 2 and 3, more BCPP-1 was used in comparison with Comparative Example 1 and, as a result, the molded articles had improved appearance but the resin compositions had reduced fluidities.

What is claimed is:

1. A thermoplastic resin composition comprising:
   35 to 85% by weight of polypropylene resin (A),
   1 to 35% by weight of elastomer (B),
   2 to 30% by weight of inorganic filler (C), and
   0.1 to 5% by weight of resin (D) defined below, wherein said amounts of the components (A), (B), (C) and (D) are each based on the combined weight of these four components:
   resin (D): resin comprising 60 to 80% by weight of a first segment which is a propylene homopolymer or a propylene-ethylene random copolymer and has an intrinsic viscosity, measured in tetralin at 135° C., of 5 dl/g or more and 20 to 40% by weight of a second segment which is a propylene homopolymer or a propylene-ethylene random copolymer and has an intrinsic viscosity, measured in tetralin at 135° C., of 0.8 to 1.2 dl/g, wherein the amounts of the first and second segments are each based on the combined weight of the two segments.

2. The thermoplastic resin composition according to claim 1, wherein the amounts of the components (A) and (B), based on the combined weight of the components (A), (B), (C) and (D), are 56 to 85% by weight and 1 to 9% by weight, respectively.

3. The thermoplastic resin composition according to claim 1, wherein the amount of the component (B), based on the combined weight of the components (A), (B), (C) and (D), is 10 to 35% by weight.

4. An injection molded article comprising the thermoplastic resin composition according to claim 1.

* * * * *